US012810225B2

(12) United States Patent
Raza et al.

(10) Patent No.: US 12,810,225 B2
(45) **Date of Patent: *Nov. 24, 2026**

(54) RAPID OPERATIONAL ANALYSIS APPLICATION FOR SUPPLY CHAIN MANAGEMENT

(71) Applicant: ThroughPut, Inc., Palo Alto, CA (US)

(72) Inventors: Ali Hussan Raza, Breinigsville, PA (US); Bhaskar Subbarao Ballapragada, Sammamish, WA (US); Seth Rom Page, Tucson, AZ (US); Anzar Kamdar, Poznan (PL)

(73) Assignee: Through Put, Inc., Palo Alto, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/825,589

(22) Filed: Sep. 5, 2024

(65) Prior Publication Data

US 2025/0005486 A1 Jan. 2, 2025

Related U.S. Application Data

(63) Continuation of application No. 17/636,102, filed as application No. PCT/US2020/050297 on Sep. 11, 2020, now Pat. No. 12,118,491.

(Continued)

(51) Int. Cl.
*G06Q 10/0633* (2023.01)
*G06Q 10/0631* (2023.01)

(52) U.S. Cl.
CPC ... *G06Q 10/0633* (2013.01); *G06Q 10/06313* (2013.01)

(58) Field of Classification Search
CPC .......................................... G06Q 10/00–50/00

(Continued)

(56) References Cited

U.S. PATENT DOCUMENTS 5,311,562 A * 5/1994 Palusamy .............. G21C 17/00 60/660
6,144,893 A * 11/2000 Van Der Vegt ........ G06Q 10/04 700/109

(Continued)

FOREIGN PATENT DOCUMENTS

WO WO 2020055783 A1 3/2020

OTHER PUBLICATIONS

International Search Report of PCT/US20/50297, dated Dec. 15, 2020.

*Primary Examiner* — Alan S Miller
(74) *Attorney, Agent, or Firm* — Davidson Kappel LLC

(57) ABSTRACT

An improved industrial process includes: receiving in a processor a plurality of data items related to an industrial process, each data item being time stamped so that each data item includes time stamp and industrial process data regarding an industrial process occurring at a time; analyzing the plurality of data items in a processor via a plurality of rules, the analyzing identifying deviations of at least one variable of the plurality of data items from a mean value of the variable; setting a statistical control parameter as an achievable quantity for the at least one variable; identifying the plurality of data items where the at least one variable exceeds the statistical control parameter to define at least one excess; and eliminating the at least one excess by shifting resources or altering the process related to the at least one quantity, the shifting or altering being a function of the analyzing of the plurality of data items. Methods related to achievable opportunities for improvement and to identifying contributing factors are also provided.

8 Claims, 4 Drawing Sheets

Related U.S. Application Data

(60) Provisional application No. 62/899,800, filed on Sep. 13, 2019.

(58) Field of Classification Search
USPC ................................................ 705/7.11–7.42
See application file for complete search history.

(56) References Cited

U.S. PATENT DOCUMENTS

| | | | | |
|---|---|---|---|---|
| 6,473,721 | B1 * | 10/2002 | Chacon | G06Q 10/06<br>702/182 |
| 6,978,222 | B2 * | 12/2005 | Roser | G05B 15/02<br>703/2 |
| 7,379,782 | B1 * | 5/2008 | Cocco | G06Q 10/06<br>703/2 |
| 8,484,069 | B2 * | 7/2013 | Kisin | G06Q 30/0202<br>705/7.29 |
| 9,438,648 | B2 * | 9/2016 | Asenjo | H04L 67/535 |
| 10,877,465 | B2 * | 12/2020 | Nixon | G05B 19/4184 |
| 2005/0040223 | A1 * | 2/2005 | Yigit | G06Q 10/105<br>705/320 |
| 2005/0149940 | A1 * | 7/2005 | Calinescu | G06F 9/5061<br>718/104 |
| 2006/0149407 | A1 * | 7/2006 | Markham | G06Q 10/087<br>700/108 |
| 2010/0268816 | A1 * | 10/2010 | Tarui | G06F 11/3409<br>718/1 |
| 2011/0282476 | A1 * | 11/2011 | Hegemier | G06Q 10/087<br>705/26.5 |

* cited by examiner

| Uploaded Data | Potential Opportunities (Annual) | |
|---|---|---|
| **All Pieces**<br>250,399 | **Savings**<br>Zero Defect Scenario<br>$40,079,000 | Achievable<br>$16,796,000 |
| **Bad Pieces**<br>12,328 | **Additional Output**<br>Zero Defect Scenario<br>200,395 units | Achievable<br>83,980 units |
| **Yield**<br>95.1% | **Rework Hours Saved**<br>Zero Defect Scenario<br>745 hrs | Achievable<br>366 hrs |

RAPID OPERATIONAL ANALYSIS APPLICATION FOR SUPPLY CHAIN MANAGEMENT

This is a Continuation of U.S. patent application Ser. No. 17/636,102, filed on Feb. 17, 2022, now published as US 2022/0358423 A1, which is a National Phase of PCT/US20/50297, filed Sep. 11, 2020 which claims priority to U.S. Provisional Application No. 62/899,800 filed Sep. 13, 2020. All of which are hereby incorporated by reference herein.

BACKGROUND

U.S. Pat. No. 6,978,222 for example describes an embodiment that performs bottleneck analysis using data continuously updated as the operation of a non steady state system progresses. Data is taken from a manufacturing system with seven machines for example.

U.S. Pat. No. 6,473,721 discloses a factory traffic monitoring analysis apparatus and method to identify actual and potential capacity constrained stations or stations with high traffic variability.

U.S. Patent Application No. 2005/0040223 discloses a system for visually displaying bottlenecks in real time, with bottlenecks being identified if a resource utilization is close to 100 percent.

Cost optimization has also been used, for example in U.S. Pat. No. 6,144,893, in order to prioritize bottleneck problems.

BRIEF SUMMARY OF THE PRESENT INVENTION

To address many of these problems, the present assignee developed its IBDMS, which is the subject of PCT Patent Application No. WO 2020/055783, filed Sep. 10, 2019, the entirety of which is hereby incorporated by reference herein.

The present invention expands on the IBDMS by allowing users to quantify actual possible industrial process or cost savings due to various bottlenecks or process limitations using a Rapid Operational Analysis System ("ROAS"). The user can set for example an achievable statistical control parameter which then allows the user to immediately and in real time see achievable industrial process or cost savings.

The present invention thus provides a method for improving an industrial process data comprising:

- receiving in a processor a plurality of data items related to an industrial process, each data item being time stamped so that each data item includes time stamp and industrial process data regarding an industrial process occurring at the time;
- analyzing the plurality of data items in a processor via a plurality of rules, the analyzing identifying deviations of at least one variable of the plurality of data items from a mean value of the variable;
- setting a statistical control parameter as an achievable quantity for the at least one variable;
- identifying the plurality of data items where the at least one variable exceeds the statistical control parameter to define an excess; and
- adding the excesses so as to define an achievable excess reduction amount for the industrial process.

The at least one variable may be for example a number of defects within a shift time.

The statistical control parameter may be for example a multiple of or be based on standard deviations from the mean value.

The number of standard deviations from mean that are achievable can be decided based on past performance or may for example be selected as a fixed number, such as 2 standard deviations.

The excess reduction amount may be supplied as a number of defects or other industrial process negative issue that may be reduced, or maybe shown as a cost.

The present invention provides an improved industrial process comprising:

- receiving in a processor a plurality of data items related to an industrial process, each data item being time stamped so that each data item includes time stamp and industrial process data regarding an industrial process occurring at a time;
- analyzing the plurality of data items in a processor via a plurality of rules, the analyzing identifying deviations of at least one variable of the plurality of data items from a mean value of the variable;
- setting a statistical control parameter as an achievable quantity for the at least one variable;
- identifying the plurality of data items where the at least one variable exceeds the statistical control parameter to define an excess;
- eliminating the excess by shifting resources or altering the process related to the at least one quantity, the shifting or altering being a function of the analyzing of the plurality of data items.

Advantageously, the excess is eliminated by shifting resources, so that the at least one variable related to a time period decreases, and the at least one variable related to a further time period increases, the at least one variable related to the time period and the at least one variable related to the further time period both remaining under the statistical control parameter.

This permits for example for a Monday morning shift where a number of product defects exceeded the statistical control parameter to receive extra or exchange workers from for example a particularly efficient Thursday evening shift where the number of defects was below the statistical control parameter and preferably below a second statistical control parameter. Thus even if the move of the Thursday evening shift workers increases the Thursday evening shift above the second statistical control parameter, it remains below the statistical control parameter, and the Monday morning shift excess can be eliminated.

The shifting or altering can occur stepwise in a control loop, preferably until all excesses are eliminated.

The present invention also provides a system for an improved industrial process comprising:

- a processor capable of receiving a plurality of data items related to an industrial process, each data item being time stamped so that each data item includes time stamp and industrial process data regarding an industrial process occurring at a time;
- an analyzer analyzing the plurality of data items in a processor via a plurality of rules, the analyzing identifying deviations of at least one variable of the plurality of data items from a mean value of the variable;
- an input for setting a statistical control parameter as an achievable quantity for the at least one variable;
- the processor identifying the plurality of data items where the at least one variable exceeds the statistical control parameter to define an excess;
- the system eliminating the excess by having shifting resources or an altered the process related to the at least one quantity, the shifting or altering being a function of the analyzing of the plurality of data items.

In a separate method, the present invention provides a method for improving an industrial process data comprising:

receiving in a processor a plurality of data items related to an industrial process, each data item being time stamped so that each data item includes time stamp and industrial process data regarding an industrial process occurring during a time period;

analyzing the plurality of data items in a processor via a plurality of rules, the analyzing identifying deviations of at least one variable of the plurality of data items from a mean value of the variable; and providing a plurality of operational factors causing the deviations, and ranking at least two of the operational factors in importance with respect to each other.

The ranking can be performed for example via the open source machine learning tools described below. This advantageously allows the operator to focus on which factors might best be used to reduce excess unwanted defects or other issues.

DETAILED DESCRIPTION

Figure 1:
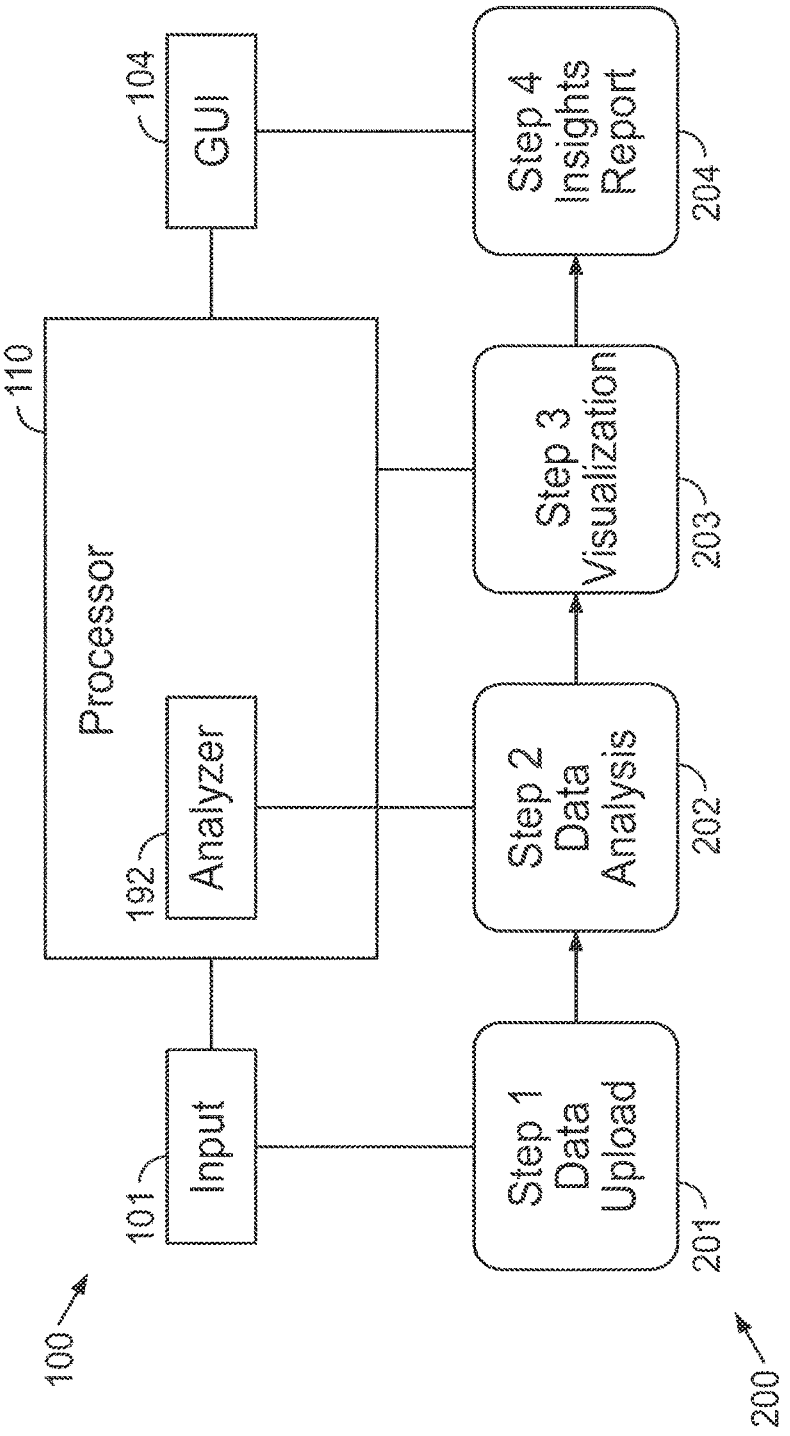
FIG. 1 shows schematically the a system 100 of the present invention with various steps performed by the system.

FIG. 1 shows the system 100 and method 200 of the present invention, with an input 101 to ingest time stamp data from any database source in multitude of formats including but not limited to csv, excel, tsv, json, xml, database query and provide a visual platform for quality improvement.

Method 200 has four components of the ROAS from input to outputs. The process employs an input screen to ingest the data and input fields to collect use case specific information in a first step 201. The second step 202 is data analysis including data preparation and clean-up through an array of statistical methods discussed below, data transformation, and application of operational and machine learning and AI for analysis by an analyzer 102 of a processor 110. The third step 203 includes feeding data to a custom third party analytic solution including but not limited to Power BI, Tableau, Qlik etc. The fourth step 204 includes ability to share the dashboard and report detailing the analysis and steps needed to improve the quality, via a GUI 104.

It is to be understood that many other possible modifications and variations can be made without departing from the spirit and scope of the invention, and FIG. 1 is a schematic overview, and reference is made as well to incorporated by reference WO 2020/055783 for the data clean-up and input and analysis.

In the present invention, a software-based method is designed to provide rapid and customized analysis for specialized use cases. The application accepts a dataset in a standardized format, performs data clean-up and transformation and executes specialized set of rules and methods for a given case to generate a visual dashboard and detailed report with analysis of the dataset. A customized analysis, visualization and reporting tool designed to address specific problem set faced by operation manager allows the operation managers to not rely on having to build these reports and perform analysis in-house manually and thereby improving their productivity and ability to make decisions rapidly.

In the present embodiment, the methodology is applied to solve quality problems faced by operators on a regular basis and in a new and novel fashion by allowing the user to (1) see the major contributing factors in the process to excess defects or other quality issues; and (2) identify potential the opportunities for reducing the excess defects and (3) providing a new process to allow for the elimination of the excess defects.

As an example, most operations collect quality metrics for their processes such as how many good and bad parts were produced during a given time period. In most cases, the quality metrics may be collected along with other factors including but not limited to station no, machine, tool, operator, supplier etc. Some other factors such as Shift, Day of Week, Shift Hour can be inferred based on time stamp of the collected data and user inputted information.

A first step 201 is data upload process which includes user uploading a dataset and selecting operational parameters, as discussed above. In the present example, the user can set specific operational parameters such as Shift timings, Total operating hours, Unit cost of defect, etc.

The second step 202 is data analysis which consists of data cleanup, data transformation and applying operational and machine learning algorithms to the transformed dataset. Data clean-up includes identifying duplicates, null values, negative values and outliers through application of variety of techniques including but not limited to pre-designed ruleset, distribution analysis, signal processing etc. Data transformation includes generating both derived and latent features and measures through application of variety of techniques including but not limited to temporal transformations, natural language processing, principle component analysis, and topic modeling such as Latent Dirichlet Allocation. User inputted time stamped data is then analyzed across derived and latent features to understand which features contribute significantly towards defect rate, highest and lowest defect rate by each contributing factor, determine a root cause for each Shift. The processor can estimate maximum and achievable savings in terms of number of parts, dollars and man hours.

The third step 203 consists of visualizing the data through both a standard Business Intelligence dashboard such as Power BI as well as a custom dashboard built using standard web frameworks. A Power BI dashboard template is first created using Desktop version with a sample dataset. The template is cloned each time with new uploaded dataset and embedded within the application. The embedded dashboard has all of the standard functionality of a Business Intelligence dashboard such as rendering graph and tables.

The fourth step consists of analysis report based on the analysis performed in Step 2 with detailed insights and prescriptive information on how to improve quality.

Advantageously, the invention allows end users to: Rapidly analyze and report common operational scenarios with existing data; Identify High & Low Quality Periods Based on multiple factors including but not limited to Shift, Shift Hour, Day of Week, Hour of Day etc; Find Maximum Potential & Achievable Saving; Identify Root Cause for Quality; Identify Contributing Factors Behind High Defect Rate; Prioritize Resources, Time and Effort in improving quality; visualize defect data in a pre-formatted dashboard with drill down capability; and generate a detailed quality report.

The present invention may be better understood in view of a specific non-limiting example of operations managers wanting immediate insight and plan for addressing quality problems within their facility. Specifically, an example in which defect data collected manually by workers in a manufacturing facility and analyzed by the ROAS software to identify which of the shift and shift hours, day of week resulted in high defect rates to be able to quickly understand where to prioritize their resources. Additionally, operators gain an understanding of how much potential improvement in terms of defects, percent improvement as well as a financial metric they can expect from changes they made.

In addition, the present invention provides an improved method that reduces unwanted excesses. These excesses can be defect parts. The improved method permits the operator to for example shift resources or alter the production method in other ways.

Most production, warehousing, distribution, logistic facilities capture quality data in the form of good parts and bad parts by given SKU, machine, production line, warehouse etc. In order to analyze the data, operations managers, floor supervisors currently lack a tool that will quickly ingest their data and provide them insights within a short period of time, for example 10 minutes, so they can act upon on the shop floor.

The present invention will be explained with a specific non-limiting example with regard to an auto manufacturer. A manufacturing facility producing components for an auto manufacturer wants ROAS to immediately identify patterns within quality data and tell the manufacturer how much money could be saved. The manufacturer had already collected hourly good parts and bad parts data. Before using ROAS, the data was sent to a data analyst who typically took 2 to 4 weeks to analyze the data using excel. By the time, the operations manager received the insight, things had changed so the manufacturer could not implement all of the analyst recommendations, and the insights were not accurate. ROAS changed that by providing novel insights, financial metric, prioritization and rapid feedback all within 10 minutes on the shop floor.

Figure 2:
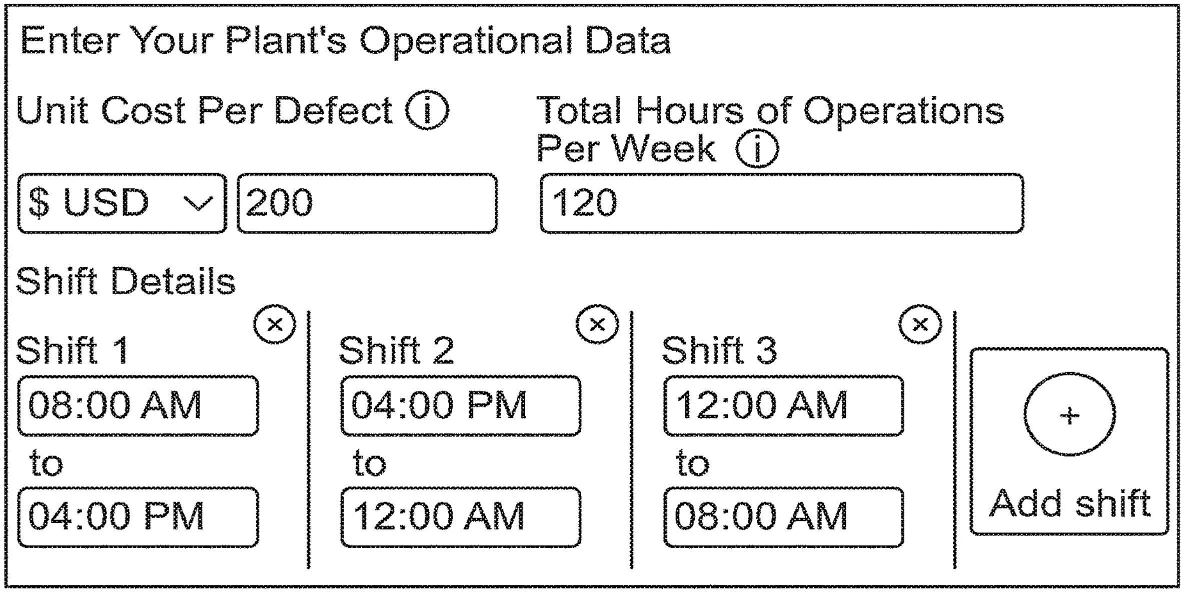
FIG. 2 shows a graphical user interface of the processor of on3 embodiment of the system of the present invention.

ROAS requires data to be uploaded in a certain format and provides a template. Table 1 shows a template along with a sample data of uploaded dataset. In the current embodiment, the uploaded dataset has four columns-Date, Hour, Good Pieces & Bad Pieces. Once the data is uploaded, the user enters specific operational and financial values pertinent to the dataset. Specifically, as shown in FIG. 2, the user is asked to enter Unit cost per defect, Weekly operating hours and shift details via a GUI input 101.

Unit cost of defect includes cost associated with (a) rework (b) scrap (c) return shipping (d) material handling (e) lost production time (f) lost revenue (g) labor (h) insurance and (i) storage. Total operating hours per week includes the number of hours the facility is operational taking into account worker breaks, downtime and unplanned maintenance. Shift hours includes ability to set day of week and hour of day per shift.

Once the data is uploaded and parameters set, the user clicks on "Analyze Your Operations" button in a separate graphical user interface to see the results of analysis immediately. A sample dataset is shown below as Table 1.

Figure 3:
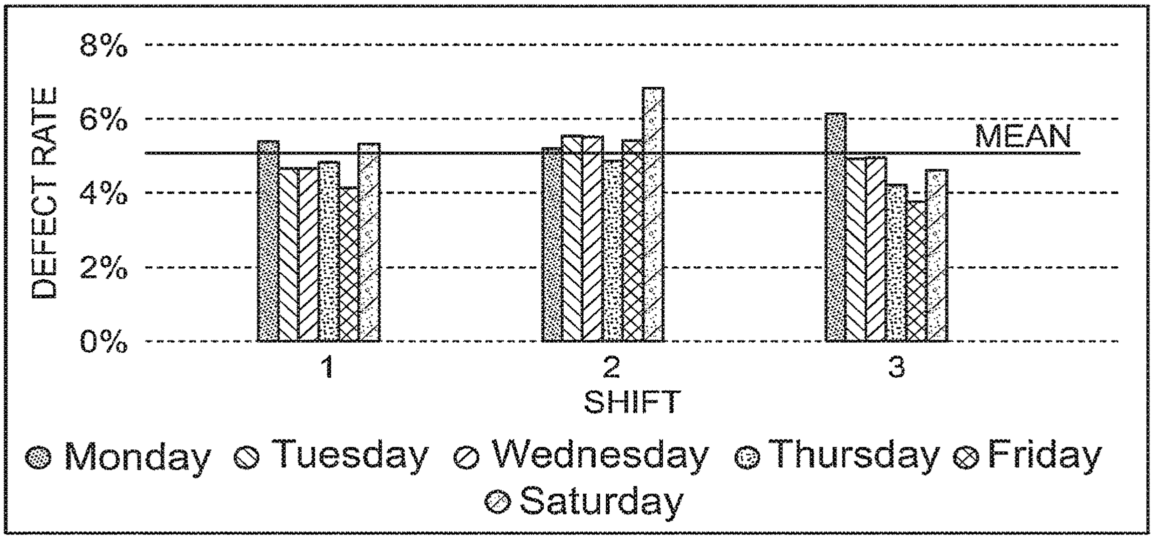
FIG. 3 shows a daily analysis output by the analyzer of the embodiment of FIG. 2 of the present invention.

The analysis provided includes four charts: FIG. 3, Average Shift Performance, FIG. 4, Shift Performance, FIG. 5 Leading Operational Factors & Process Behavior Chart and FIG. 7, Potential Opportunities, as well as a Defect Rate vs. Time Stamp graph in FIG. 6.

FIG. 3 displays Average Shift Performance. Average Shift Performance is a bar chart that breaks down the defect rate into 3 cluster of bars, one cluster each per shift. Each bar represents a day of week as shown in FIG. 2. The visualization benchmarks the average defect for all 3 work shifts during the average week. The dotted line is the overall average defect rate. Any bar that is higher than the dotted line needs to be immediately addressed.

The user can immediately see how the defect rate varies by shift and day of week. In the current example, three periods with the highest defect rate were: 1) Saturday in Shift 2 (defect rate of 6.85%) 2) Monday in Shift 3 (defect rate of 6.14%) 3) Tuesday in Shift 2 (defect rate of 5.52%) Also, three periods with lowest defect rate or where the operations were running smoothly were: 1) Friday in Shift 3 (defect rate of 3.71%) 2) Friday in Shift 1 (defect rate of 4.10%) 3) Thursday in Shift 3 (defect rate of 4.18%) The user (operations manager) can very quickly prioritize supervision of the days and shift as well as devote more experienced resources during a period of high defect rate while freeing up people from time periods with lowest defect rate. Shifting of personnel from more efficient to less efficient shifts can occur, and due to ROAS the effect can be analyzed efficiently.

Figure 4:
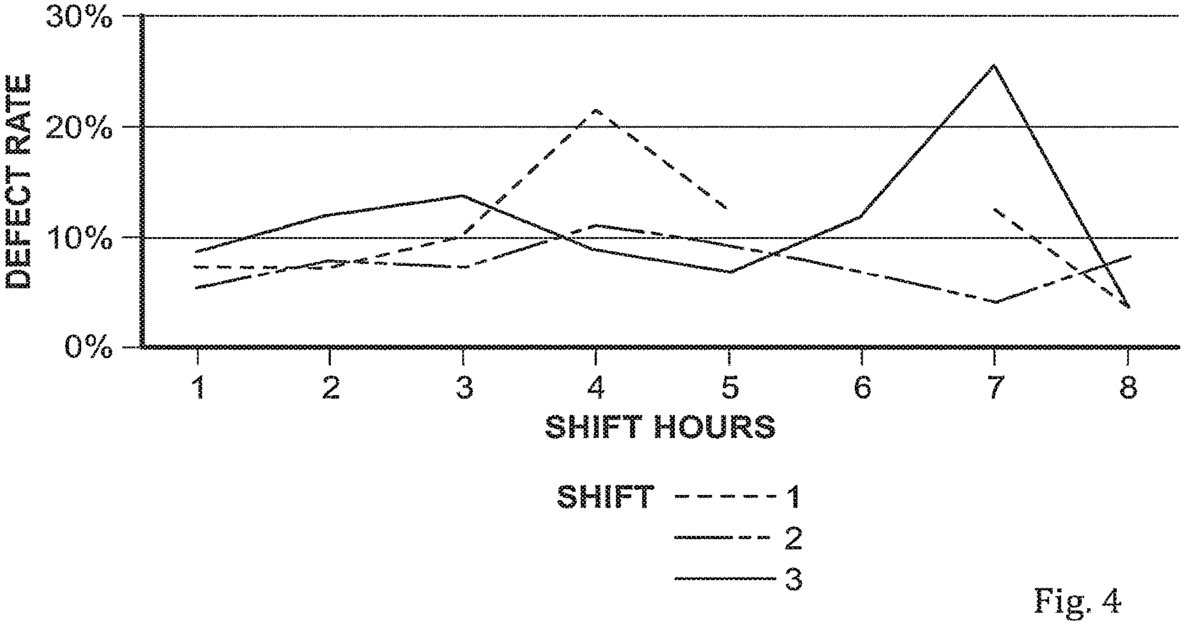
FIG. 4 shows an hourly analysis output by the analyzer of the embodiment of FIG. 2 of the present invention.

Once the user has completed addressing issues at the shift level, the next step is to drill down into hourly performance for each shift, allowing an operator to further smooth out the process. FIG. 4 shows shift performance by hour. The user can see immediately that the Shift 2 performance is even throughout the Shift Period whereas Shift 3 is highly uneven with peak occurring in Shift Hour 7. Given this is a night shift, the uneven behavior could be tied to Operator fatigue and could be addressed with appropriate breaks.

Leading Operational Factors

Figure 5:
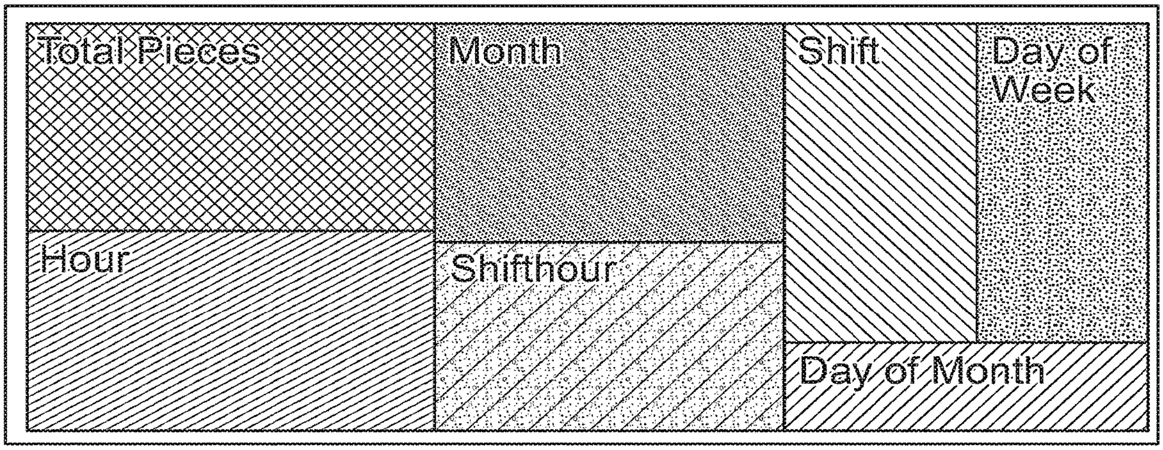
FIG. 5 shows the leading operational factors causing defects in the process of the FIG. 2 embodiment of the present invention.

Having an ability to rapidly access the possible reasons for quality problems as opposed to spending valuable time slicing and dicing graphs and charts can significantly impact operation managers ability to identify the problem and address it. FIG. 5 visualizes the correlation between several features and defect rate as a treemap. The larger the size the rectangle in the treemap, the higher the contributing factor the feature plays for the defect rate. In the current example, the defect rate seems to equally impacted by volume (total pieces), hour of the day, shift hour, and month and to lesser degree by Shift and Day of Week. The operator therefore can focus their effort to see if increasing the volume of units results in decrease in quality due to overload of work and look into the shift hour to see which hours of the shifts are driving the defects higher.

Figures 6, 7:
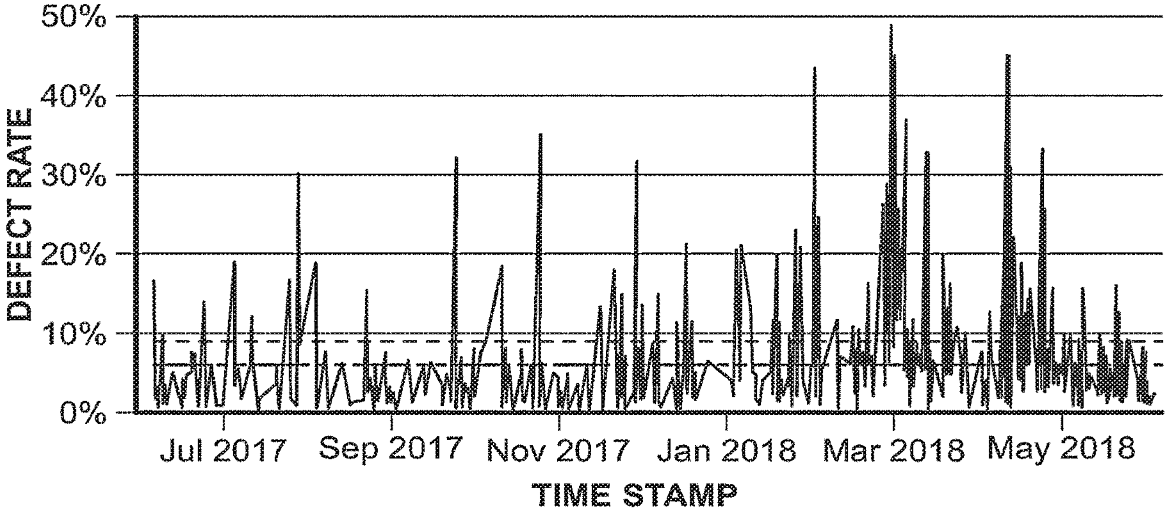
FIG. 6 shows an hourly defect rate graph of the process of the FIG. 2 embodiment of the present invention.
FIG. 7 shows a potential opportunity based on a standard deviation statistical control parameter.

FIG. 6 shows a detailed graph of all the defect data entered by users on time axis along with statistically significant upper control limit. Any point above the upper control limit is considered to be statistically outside the normal behavior and can be brought below the limit given sufficient time and resources. In the current example, the user can see the defect rate varying significantly on an hourly basis with several of the data points above the upper control limit. The large number of data points above the upper control limits suggests the process is statistically out of control and difficult to manage.

Potential Opportunity Estimations

ROAS estimates potential savings, additional output and amount of resource hours saved as a result of reducing the defect based on statistical analysis of the uploaded data. Uploaded data shows a quick summary of uploaded dataset. For the current example, the uploaded dataset had 250,399 total pieces, 12,328 bad pieces with an average yield of 95.1% or an average defect rate of 4.9%. Potential savings, additional output and rework hours saved calculations for zero defect scenario were based on assumption that there were zero defects or all bad pieces are counted as good pieces. Achievable savings, output and rework are based on the assumption that the operator can bring down the defect rate down to within 95% percentile. Achievable output can be based on past knowledge, or as a standard deviation of the defects from mean, for example two standard deviations, or a percentile. This number is then used a statistical control parameter within ROAS to permit the potential opportunity estimation.

In the current example, ROAS estimated that the potential savings on annualized basis for zero defect scenario was approx. $40.08 M based on additional output of 200,395 units at a unit cost per defect of $200. ROAS estimated that the achievable savings were $16.80 M by bringing down all of the defects to within 95% percentile of the uploaded data, as shown in FIG. 6.

An explanation of how the various Figures were created and calculated is described below with reference to Table 1, which shows the dataset used. The dataset contains 484 rows of data in 4 columns (date, hour, good pieces and bad pieces).

TABLE 1

| Date | Hour | Good_pieces | Bad_pieces |
|---|---|---|---|
| Jun. 5, 2017 | 17 | 351 | 70 |
| Jun. 5, 2017 | 23 | 268 | 51 |
| Jun. 6, 2017 | 7 | 874 | 14 |
| Jun. 6, 2017 | 22 | 706 | 21 |
| Jun. 7, 2017 | 7 | 171 | 1 |
| Jun. 8, 2017 | 24 | 485 | 53 |
| Jun. 9, 2017 | 7 | 655 | 7 |
| Jun. 9, 2017 | 22 | 761 | 7 |
| Jun. 10, 2017 | 7 | 719 | 9 |
| Jun. 10, 2017 | 19 | 228 | 9 |
| Jun. 12, 2017 | 8 | 556 | 29 |
| Jun. 14, 2017 | 22 | 334 | 2 |
| Jun. 15, 2017 | 3 | 352 | 15 |
| Jun. 15, 2017 | 7 | 668 | 10 |
| Jun. 15, 2017 | 15 | 620 | 15 |
| Jun. 15, 2017 | 22 | 670 | 30 |
| Jun. 16, 2017 | 7 | 567 | 2 |
| Jun. 16, 2017 | 15 | 642 | 9 |
| Jun. 16, 2017 | 22 | 464 | 23 |
| Jun. 19, 2017 | 8 | 529 | 29 |
| Jun. 19, 2017 | 15 | 550 | 46 |
| Jun. 19, 2017 | 23 | 602 | 33 |
| Jun. 21, 2017 | 3 | 340 | 28 |
| Jun. 21, 2017 | 15 | 420 | 3 |
| Jun. 23, 2017 | 20 | 245 | 39 |
| Jun. 23, 2017 | 23 | 645 | 24 |
| Jun. 24, 2017 | 7 | 408 | 3 |
| Jun. 26, 2017 | 10 | 351 | 19 |
| Jun. 26, 2017 | 15 | 552 | 35 |
| Jun. 28, 2017 | 15 | 640 | 5 |
| Jul. 1, 2017 | 2 | 521 | 5 |
| Jul. 1, 2017 | 7 | 690 | 11 |
| Jul. 1, 2017 | 15 | 518 | 10 |
| Jul. 3, 2017 | 7 | 209 | 24 |
| Jul. 5, 2017 | 1 | 337 | 77 |

TABLE 1-continued

| Date | Hour | Good_pieces | Bad_pieces |
|---|---|---|---|
| Jul. 5, 2017 | 8 | 555 | 18 |
| Jul. 6, 2017 | 16 | 507 | 28 |
| Jul. 6, 2017 | 22 | 720 | 13 |
| Jul. 7, 2017 | 7 | 178 | 3 |
| Jul. 11, 2017 | 3 | 219 | 14 |
| Jul. 11, 2017 | 7 | 110 | 15 |
| Jul. 11, 2017 | 9 | 529 | 10 |
| Jul. 12, 2017 | 7 | 47 | 3 |
| Jul. 13, 2017 | 7 | 712 | 4 |
| Jul. 13, 2017 | 15 | 678 | 1 |
| Jul. 14, 2017 | 7 | 665 | 13 |
| Jul. 19, 2017 | 22 | 722 | 25 |
| Jul. 20, 2017 | 7 | 106 | 4 |
| Jul. 20, 2017 | 9 | 468 | 19 |
| Jul. 20, 2017 | 15 | 554 | 34 |
| Jul. 21, 2017 | 7 | 415 | 2 |
| Jul. 25, 2017 | 6 | 30 | 6 |
| Jul. 25, 2017 | 8 | 540 | 15 |
| Jul. 25, 2017 | 22 | 712 | 9 |
| Jul. 26, 2017 | 7 | 624 | 8 |
| Jul. 26, 2017 | 22 | 711 | 8 |
| Jul. 27, 2017 | 7 | 679 | 5 |
| Jul. 27, 2017 | 22 | 557 | 9 |
| Jul. 28, 2017 | 6 | 51 | 22 |
| Jul. 28, 2017 | 7 | 544 | 6 |
| Jul. 28, 2017 | 14 | 60 | 5 |
| Aug. 3, 2017 | 14 | 39 | 9 |
| Aug. 3, 2017 | 16 | 477 | 33 |
| Aug. 3, 2017 | 22 | 735 | 4 |
| Aug. 4, 2017 | 15 | 655 | 6 |
| Aug. 7, 2017 | 7 | 321 | 26 |
| Aug. 7, 2017 | 16 | 546 | 23 |
| Aug. 7, 2017 | 22 | 759 | 4 |
| Aug. 8, 2017 | 15 | 687 | 12 |
| Aug. 12, 2017 | 17 | 239 | 14 |
| Aug. 14, 2017 | 8 | 537 | 17 |
| Aug. 14, 2017 | 17 | 440 | 7 |
| Aug. 14, 2017 | 22 | 696 | 15 |
| Aug. 15, 2017 | 7 | 676 | 11 |
| Aug. 16, 2017 | 7 | 688 | 5 |
| Aug. 16, 2017 | 22 | 725 | 10 |
| Aug. 21, 2017 | 16 | 565 | 9 |
| Aug. 22, 2017 | 7 | 22 | 4 |
| Aug. 23, 2017 | 10 | 370 | 6 |
| Aug. 24, 2017 | 7 | 697 | 8 |
| Aug. 24, 2017 | 15 | 664 | 0 |
| Aug. 24, 2017 | 22 | 443 | 21 |
| Aug. 25, 2017 | 9 | 419 | 24 |
| Aug. 25, 2017 | 15 | 251 | 6 |
| Aug. 25, 2017 | 19 | 262 | 3 |
| Aug. 29, 2017 | 7 | 541 | 45 |
| Aug. 29, 2017 | 15 | 631 | 13 |
| Aug. 29, 2017 | 22 | 727 | 8 |
| Aug. 30, 2017 | 7 | 593 | 24 |
| Aug. 30, 2017 | 22 | 730 | 9 |
| Aug. 31, 2017 | 7 | 664 | 11 |
| Aug. 31, 2017 | 22 | 712 | 18 |
| Sep. 1, 2017 | 7 | 699 | 4 |
| Sep. 1, 2017 | 19 | 223 | 6 |
| Sep. 1, 2017 | 22 | 655 | −1 |
| Sep. 6, 2017 | 12 | 272 | 19 |
| Sep. 6, 2017 | 22 | 703 | 19 |
| Sep. 7, 2017 | 7 | 644 | 17 |
| Sep. 7, 2017 | 22 | 731 | 7 |
| Sep. 11, 2017 | 18 | 344 | 21 |
| Sep. 11, 2017 | 22 | 749 | 16 |
| Sep. 12, 2017 | 15 | 618 | 22 |
| Sep. 13, 2017 | 9 | 405 | 16 |
| Sep. 13, 2017 | 15 | 608 | 25 |
| Sep. 13, 2017 | 24 | 514 | 26 |
| Sep. 14, 2017 | 7 | 622 | 42 |
| Sep. 18, 2017 | 10 | 355 | 12 |
| Sep. 18, 2017 | 15 | 643 | 6 |
| Sep. 18, 2017 | 23 | 630 | 23 |
| Sep. 20, 2017 | 1 | 480 | 24 |
| Sep. 20, 2017 | 7 | 668 | 21 |
| Sep. 21, 2017 | 15 | 621 | 19 |
| Sep. 21, 2017 | 22 | 722 | 10 |

TABLE 1-continued

| Date | Hour | Good_pieces | Bad_pieces |
|---|---|---|---|
| Sep. 22, 2017 | 16 | 110 | 37 |
| Sep. 23, 2017 | 12 | 146 | 69 |
| Sep. 23, 2017 | 15 | 535 | 2 |
| Sep. 25, 2017 | 8 | 546 | 41 |
| Sep. 25, 2017 | 15 | 650 | 2 |
| Sep. 25, 2017 | 22 | 430 | 11 |
| Sep. 26, 2017 | 4 | 225 | 17 |
| Sep. 26, 2017 | 7 | 664 | 18 |
| Sep. 27, 2017 | 17 | 433 | 11 |
| Sep. 27, 2017 | 22 | 718 | 25 |
| Sep. 28, 2017 | 15 | 668 | 2 |
| Sep. 28, 2017 | 22 | 740 | 12 |
| Sep. 29, 2017 | 15 | 658 | 8 |
| Sep. 29, 2017 | 22 | 637 | 53 |
| Sep. 30, 2017 | 15 | 212 | 5 |
| Oct. 2, 2017 | 16 | 473 | 47 |
| Oct. 3, 2017 | 7 | 436 | 33 |
| Oct. 6, 2017 | 24 | 442 | 65 |
| Oct. 9, 2017 | 9 | 367 | 82 |
| Oct. 9, 2017 | 17 | 439 | 50 |
| Oct. 10, 2017 | 1 | 446 | 74 |
| Oct. 10, 2017 | 7 | 686 | 4 |
| Oct. 11, 2017 | 15 | 528 | 46 |
| Oct. 11, 2017 | 22 | 179 | 2 |
| Oct. 12, 2017 | 16 | 481 | 17 |
| Oct. 13, 2017 | 12 | 134 | 7 |
| Oct. 13, 2017 | 17 | 429 | 25 |
| Oct. 13, 2017 | 22 | 739 | 13 |
| Oct. 14, 2017 | 7 | 711 | 2 |
| Oct. 14, 2017 | 15 | 527 | 6 |
| Oct. 16, 2017 | 8 | 558 | 24 |
| Oct. 16, 2017 | 15 | 555 | 13 |
| Oct. 16, 2017 | 22 | 480 | 7 |
| Oct. 17, 2017 | 20 | 151 | 13 |
| Oct. 17, 2017 | 23 | 640 | 13 |
| Oct. 18, 2017 | 9 | 435 | 6 |
| Oct. 18, 2017 | 15 | 626 | 13 |
| Oct. 18, 2017 | 22 | 739 | 9 |
| Oct. 19, 2017 | 15 | 153 | 4 |
| Oct. 21, 2017 | 5 | 119 | 7 |
| Oct. 21, 2017 | 7 | 704 | 3 |
| Oct. 23, 2017 | 12 | 171 | 36 |
| Oct. 23, 2017 | 15 | 657 | 5 |
| Oct. 23, 2017 | 22 | 173 | 5 |
| Oct. 24, 2017 | 2 | 208 | 112 |
| Oct. 24, 2017 | 7 | 326 | 17 |
| Oct. 25, 2017 | 8 | 496 | 28 |
| Oct. 25, 2017 | 15 | 640 | 12 |
| Oct. 25, 2017 | 22 | 751 | 3 |
| Oct. 26, 2017 | 7 | 630 | 13 |
| Oct. 26, 2017 | 15 | 171 | 2 |
| Oct. 28, 2017 | 16 | 436 | 22 |
| Oct. 30, 2017 | 7 | 647 | 29 |
| Oct. 30, 2017 | 15 | 637 | 10 |
| Oct. 30, 2017 | 22 | 738 | 6 |
| Oct. 31, 2017 | 7 | 641 | 18 |
| Oct. 31, 2017 | 22 | 742 | 5 |
| Nov. 1, 2017 | 7 | 679 | 4 |
| Nov. 3, 2017 | 7 | 608 | 31 |
| Nov. 3, 2017 | 15 | 653 | 2 |
| Nov. 3, 2017 | 22 | 741 | 4 |
| Nov. 4, 2017 | 7 | 100 | 2 |
| Nov. 4, 2017 | 9 | 478 | 14 |
| Nov. 4, 2017 | 15 | 560 | 4 |
| Nov. 6, 2017 | 15 | 626 | 18 |
| Nov. 6, 2017 | 22 | 696 | 25 |
| Nov. 7, 2017 | 7 | 702 | 2 |
| Nov. 7, 2017 | 15 | 272 | 5 |
| Nov. 9, 2017 | 23 | 606 | 29 |
| Nov. 10, 2017 | 7 | 563 | 36 |
| Nov. 10, 2017 | 15 | 625 | 12 |
| Nov. 10, 2017 | 22 | 721 | 2 |
| Nov. 11, 2017 | 7 | 618 | 25 |
| Nov. 11, 2017 | 15 | 525 | 23 |
| Nov. 15, 2017 | 2 | 272 | 41 |
| Nov. 15, 2017 | 7 | 645 | 18 |
| Nov. 15, 2017 | 15 | 645 | 15 |
| Nov. 15, 2017 | 22 | 760 | 1 |
| Nov. 16, 2017 | 7 | 103 | 2 |
| Nov. 18, 2017 | 1 | 454 | 26 |
| Nov. 18, 2017 | 7 | 573 | 40 |
| Nov. 20, 2017 | 7 | 180 | 39 |
| Nov. 21, 2017 | 7 | 516 | 52 |
| Nov. 21, 2017 | 15 | 656 | 3 |
| Nov. 21, 2017 | 23 | 652 | 27 |
| Nov. 22, 2017 | 7 | 413 | 13 |
| Nov. 22, 2017 | 19 | 208 | 36 |
| Nov. 22, 2017 | 22 | 726 | 9 |
| Nov. 23, 2017 | 7 | 585 | 30 |
| Nov. 23, 2017 | 15 | 517 | 2 |
| Nov. 23, 2017 | 22 | 734 | 4 |
| Nov. 24, 2017 | 7 | 332 | 24 |
| Nov. 24, 2017 | 12 | 183 | 14 |
| Nov. 24, 2017 | 15 | 433 | 1 |
| Nov. 27, 2017 | 17 | 377 | 10 |
| Nov. 27, 2017 | 22 | 537 | 7 |
| Nov. 28, 2017 | 5 | 113 | 8 |
| Nov. 28, 2017 | 8 | 331 | 153 |
| Nov. 28, 2017 | 15 | 603 | 14 |
| Nov. 28, 2017 | 22 | 728 | 30 |
| Nov. 29, 2017 | 7 | 601 | 38 |
| Nov. 29, 2017 | 15 | 621 | 10 |
| Nov. 30, 2017 | 7 | 487 | 75 |
| Nov. 30, 2017 | 15 | 606 | 17 |
| Nov. 30, 2017 | 22 | 720 | 13 |
| Dec. 4, 2017 | 8 | 540 | 51 |
| Dec. 4, 2017 | 15 | 609 | 16 |
| Dec. 4, 2017 | 22 | 675 | 12 |
| Dec. 5, 2017 | 7 | 616 | 7 |
| Dec. 5, 2017 | 15 | 645 | 13 |
| Dec. 5, 2017 | 22 | 538 | 94 |
| Dec. 6, 2017 | 7 | 671 | 25 |
| Dec. 6, 2017 | 15 | 609 | 28 |
| Dec. 6, 2017 | 22 | 141 | 1 |
| Dec. 11, 2017 | 8 | 498 | 21 |
| Dec. 11, 2017 | 15 | 263 | 7 |
| Dec. 12, 2017 | 17 | 405 | 51 |
| Dec. 12, 2017 | 22 | 552 | 2 |
| Dec. 13, 2017 | 10 | 362 | 16 |
| Dec. 13, 2017 | 15 | 644 | 2 |
| Dec. 14, 2017 | 7 | 674 | 14 |
| Dec. 14, 2017 | 15 | 649 | 17 |
| Dec. 15, 2017 | 7 | 298 | 24 |
| Dec. 16, 2017 | 5 | 126 | 34 |
| Dec. 16, 2017 | 7 | 675 | 18 |
| Dec. 18, 2017 | 7 | 567 | 73 |
| Dec. 18, 2017 | 15 | 479 | 25 |
| Dec. 19, 2017 | 7 | 643 | 12 |
| Dec. 19, 2017 | 15 | 663 | 12 |
| Dec. 19, 2017 | 22 | 636 | 33 |
| Dec. 20, 2017 | 7 | 699 | 14 |
| Dec. 23, 2017 | 17 | 282 | 19 |
| Jan. 2, 2018 | 8 | 620 | 25 |
| Jan. 2, 2018 | 15 | 636 | 14 |
| Jan. 3, 2018 | 10 | 260 | 67 |
| Jan. 3, 2018 | 15 | 576 | 46 |
| Jan. 4, 2018 | 7 | 502 | 75 |
| Jan. 4, 2018 | 15 | 594 | 25 |
| Jan. 5, 2018 | 7 | 154 | 41 |
| Jan. 8, 2018 | 8 | 417 | 62 |
| Jan. 8, 2018 | 15 | 224 | 16 |
| Jan. 8, 2018 | 19 | 244 | 37 |
| Jan. 9, 2018 | 7 | 673 | 32 |
| Jan. 10, 2018 | 7 | 649 | 34 |
| Jan. 10, 2018 | 15 | 648 | 10 |
| Jan. 11, 2018 | 7 | 693 | 13 |
| Jan. 11, 2018 | 15 | 661 | 6 |
| Jan. 13, 2018 | 7 | 556 | 24 |
| Jan. 15, 2018 | 8 | 573 | 30 |
| Jan. 15, 2018 | 22 | 719 | 23 |
| Jan. 16, 2018 | 12 | 222 | 20 |
| Jan. 16, 2018 | 15 | 650 | 16 |
| Jan. 18, 2018 | 3 | 231 | 57 |
| Jan. 18, 2018 | 7 | 690 | 11 |
| Jan. 18, 2018 | 15 | 652 | 10 |
| Jan. 18, 2018 | 22 | 602 | 78 |

TABLE 1-continued

| Date | Hour | Good_pieces | Bad_pieces |
|---|---|---|---|
| Jan. 19, 2018 | 7 | 671 | 21 |
| Jan. 19, 2018 | 22 | 699 | 28 |
| Jan. 20, 2018 | 7 | 671 | 15 |
| Jan. 22, 2018 | 19 | 291 | 13 |
| Jan. 22, 2018 | 22 | 593 | 64 |
| Jan. 23, 2018 | 7 | 687 | 16 |
| Jan. 23, 2018 | 15 | 721 | 7 |
| Jan. 23, 2018 | 22 | 632 | 55 |
| Jan. 24, 2018 | 7 | 613 | 49 |
| Jan. 24, 2018 | 23 | 403 | 120 |
| Jan. 25, 2018 | 7 | 692 | 14 |
| Jan. 25, 2018 | 22 | 559 | 76 |
| Jan. 26, 2018 | 12 | 150 | 19 |
| Jan. 26, 2018 | 22 | 68 | 18 |
| Jan. 26, 2018 | 24 | 470 | 39 |
| Jan. 27, 2018 | 7 | 647 | 29 |
| Jan. 29, 2018 | 20 | 737 | 7 |
| Jan. 29, 2018 | 23 | 672 | 19 |
| Jan. 30, 2018 | 7 | 679 | 19 |
| Jan. 30, 2018 | 15 | 612 | 36 |
| Jan. 30, 2018 | 22 | 642 | 36 |
| Jan. 31, 2018 | 7 | 425 | 30 |
| Jan. 31, 2018 | 20 | 108 | 83 |
| Jan. 31, 2018 | 23 | 597 | 56 |
| Feb. 1, 2018 | 7 | 625 | 13 |
| Feb. 1, 2018 | 22 | 113 | 37 |
| Feb. 2, 2018 | 11 | 220 | 64 |
| Feb. 2, 2018 | 15 | 661 | 7 |
| Feb. 2, 2018 | 22 | 680 | 32 |
| Feb. 8, 2018 | 19 | 185 | 24 |
| Feb. 8, 2018 | 23 | 519 | 63 |
| Feb. 9, 2018 | 7 | 674 | 26 |
| Feb. 9, 2018 | 15 | 664 | 4 |
| Feb. 9, 2018 | 22 | 665 | 51 |
| Feb. 14, 2018 | 17 | 404 | 26 |
| Feb. 14, 2018 | 22 | 601 | 72 |
| Feb. 15, 2018 | 7 | 350 | 9 |
| Feb. 15, 2018 | 12 | 208 | 18 |
| Feb. 15, 2018 | 15 | 583 | 40 |
| Feb. 16, 2018 | 7 | 705 | 3 |
| Feb. 16, 2018 | 15 | 607 | 18 |
| Feb. 16, 2018 | 22 | 95 | 11 |
| Feb. 19, 2018 | 8 | 404 | 13 |
| Feb. 20, 2018 | 10 | 297 | 57 |
| Feb. 20, 2018 | 15 | 573 | 40 |
| Feb. 21, 2018 | 7 | 629 | 39 |
| Feb. 21, 2018 | 15 | 573 | 45 |
| Feb. 21, 2018 | 22 | 578 | 41 |
| Feb. 22, 2018 | 7 | 96 | 2 |
| Feb. 24, 2018 | 8 | 440 | 54 |
| Feb. 24, 2018 | 15 | 337 | 57 |
| Feb. 26, 2018 | 10 | 202 | 72 |
| Feb. 26, 2018 | 15 | 502 | 18 |
| Feb. 26, 2018 | 23 | 580 | 63 |
| Feb. 27, 2018 | 7 | 181 | 73 |
| Feb. 27, 2018 | 24 | 263 | 94 |
| Feb. 28, 2018 | 8 | 542 | 38 |
| Feb. 28, 2018 | 15 | 626 | 43 |
| Feb. 28, 2018 | 22 | 114 | 108 |
| Mar. 1, 2018 | 12 | 197 | 37 |
| Mar. 1, 2018 | 15 | 66 | 54 |
| Mar. 2, 2018 | 9 | 356 | 71 |
| Mar. 2, 2018 | 15 | 152 | 14 |
| Mar. 2, 2018 | 18 | 258 | 56 |
| Mar. 2, 2018 | 22 | 325 | 90 |
| Mar. 3, 2018 | 7 | 494 | 85 |
| Mar. 3, 2018 | 15 | 276 | 36 |
| Mar. 3, 2018 | 19 | 113 | 39 |
| Mar. 5, 2018 | 8 | 458 | 61 |
| Mar. 5, 2018 | 15 | 524 | 30 |
| Mar. 5, 2018 | 23 | 257 | 150 |
| Mar. 6, 2018 | 7 | 647 | 38 |
| Mar. 6, 2018 | 22 | 704 | 32 |
| Mar. 7, 2018 | 7 | 570 | 55 |
| Mar. 7, 2018 | 15 | 659 | 5 |
| Mar. 7, 2018 | 22 | 720 | 23 |
| Mar. 8, 2018 | 7 | 225 | 7 |
| Mar. 8, 2018 | 20 | 172 | 7 |

TABLE 1-continued

| Date | Hour | Good_pieces | Bad_pieces |
|---|---|---|---|
| Mar. 8, 2018 | 22 | 345 | 44 |
| Mar. 10, 2018 | 20 | 186 | 12 |
| Mar. 12, 2018 | 7 | 498 | 28 |
| Mar. 13, 2018 | 17 | 250 | 122 |
| Mar. 13, 2018 | 22 | 722 | 22 |
| Mar. 14, 2018 | 7 | 694 | 2 |
| Mar. 14, 2018 | 15 | 578 | 49 |
| Mar. 14, 2018 | 23 | 634 | 8 |
| Mar. 15, 2018 | 7 | 630 | 25 |
| Mar. 15, 2018 | 15 | 372 | 6 |
| Mar. 15, 2018 | 20 | 183 | 13 |
| Mar. 19, 2018 | 7 | 600 | 17 |
| Mar. 19, 2018 | 15 | 374 | 93 |
| Mar. 19, 2018 | 22 | 529 | 10 |
| Mar. 21, 2018 | 15 | 455 | 72 |
| Mar. 21, 2018 | 22 | 577 | 28 |
| Mar. 22, 2018 | 8 | 449 | 86 |
| Mar. 22, 2018 | 15 | 345 | 17 |
| Mar. 22, 2018 | 24 | 610 | 46 |
| Mar. 24, 2018 | 20 | 134 | 16 |
| Mar. 26, 2018 | 7 | 527 | 38 |
| Mar. 26, 2018 | 15 | 643 | 17 |
| Mar. 27, 2018 | 23 | 582 | 64 |
| Mar. 28, 2018 | 7 | 676 | 25 |
| Mar. 28, 2018 | 15 | 633 | 22 |
| Mar. 29, 2018 | 7 | 699 | 3 |
| Apr. 2, 2018 | 21 | 49 | 4 |
| Apr. 2, 2018 | 22 | 726 | 6 |
| Apr. 3, 2018 | 7 | 699 | 9 |
| Apr. 3, 2018 | 15 | 624 | 25 |
| Apr. 3, 2018 | 22 | 397 | 3 |
| Apr. 4, 2018 | 24 | 608 | 0 |
| Apr. 5, 2018 | 7 | 561 | 44 |
| Apr. 5, 2018 | 20 | 174 | 25 |
| Apr. 5, 2018 | 22 | 115 | 9 |
| Apr. 7, 2018 | 7 | 645 | 42 |
| Apr. 9, 2018 | 8 | 531 | 10 |
| Apr. 9, 2018 | 15 | 598 | 16 |
| Apr. 9, 2018 | 22 | 165 | 9 |
| Apr. 10, 2018 | 2 | 375 | 25 |
| Apr. 10, 2018 | 7 | 96 | 8 |
| Apr. 11, 2018 | 2 | 296 | 83 |
| Apr. 11, 2018 | 7 | 680 | 18 |
| Apr. 11, 2018 | 15 | 663 | 6 |
| Apr. 11, 2018 | 22 | 71 | 58 |
| Apr. 12, 2018 | 1 | 305 | 75 |
| Apr. 12, 2018 | 11 | 144 | 65 |
| Apr. 12, 2018 | 23 | 557 | 57 |
| Apr. 13, 2018 | 7 | 618 | 3 |
| Apr. 13, 2018 | 15 | 349 | 58 |
| Apr. 13, 2018 | 22 | 250 | 71 |
| Apr. 16, 2018 | 7 | 612 | 32 |
| Apr. 16, 2018 | 15 | 606 | 26 |
| Apr. 16, 2018 | 22 | 449 | 102 |
| Apr. 17, 2018 | 9 | 403 | 60 |
| Apr. 17, 2018 | 15 | 637 | 18 |
| Apr. 17, 2018 | 22 | 603 | 87 |
| Apr. 18, 2018 | 7 | 576 | 33 |
| Apr. 18, 2018 | 22 | 557 | 88 |
| Apr. 19, 2018 | 7 | 224 | 37 |
| Apr. 19, 2018 | 11 | 259 | 42 |
| Apr. 19, 2018 | 15 | 549 | 34 |
| Apr. 19, 2018 | 22 | 269 | 49 |
| Apr. 23, 2018 | 8 | 659 | 20 |
| Apr. 23, 2018 | 15 | 554 | 42 |
| Apr. 23, 2018 | 23 | 342 | 32 |
| Apr. 24, 2018 | 19 | 137 | 68 |
| Apr. 24, 2018 | 22 | 708 | 29 |
| Apr. 25, 2018 | 7 | 625 | 16 |
| Apr. 25, 2018 | 15 | 544 | 50 |
| Apr. 25, 2018 | 22 | 705 | 22 |
| Apr. 26, 2018 | 7 | 545 | 15 |
| Apr. 28, 2018 | 10 | 291 | 53 |
| Apr. 28, 2018 | 15 | 159 | 10 |
| Apr. 28, 2018 | 17 | 327 | 12 |
| Apr. 30, 2018 | 7 | 590 | 41 |
| Apr. 30, 2018 | 15 | 617 | 22 |
| Apr. 30, 2018 | 22 | 706 | 29 |

TABLE 1-continued

| Date | Hour | Good_pieces | Bad_pieces |
|---|---|---|---|
| May 1, 2018 | 7 | 217 | 10 |
| May 2, 2018 | 8 | 467 | 44 |
| May 2, 2018 | 15 | 438 | 47 |
| May 2, 2018 | 21 | 89 | 6 |
| May 2, 2018 | 22 | 723 | 20 |
| May 3, 2018 | 15 | 577 | 40 |
| May 5, 2018 | 3 | 217 | 24 |
| May 5, 2018 | 7 | 602 | 28 |
| May 5, 2018 | 15 | 658 | 5 |
| May 7, 2018 | 20 | 173 | 17 |
| May 7, 2018 | 22 | 648 | 18 |
| May 8, 2018 | 7 | 694 | 4 |
| May 8, 2018 | 15 | 623 | 14 |
| May 8, 2018 | 22 | 650 | 25 |
| May 9, 2018 | 7 | 708 | 5 |
| May 9, 2018 | 15 | 131 | 24 |
| May 9, 2018 | 17 | 427 | 12 |
| May 10, 2018 | 18 | 613 | 18 |
| May 10, 2018 | 22 | 686 | 19 |
| May 11, 2018 | 7 | 631 | 33 |
| May 11, 2018 | 15 | 606 | 29 |
| May 14, 2018 | 8 | 527 | 18 |
| May 14, 2018 | 15 | 595 | 33 |
| May 14, 2018 | 22 | 703 | 15 |
| May 15, 2018 | 7 | 674 | 20 |
| May 15, 2018 | 15 | 161 | 17 |
| May 17, 2018 | 3 | 266 | 21 |
| May 17, 2018 | 7 | 670 | 12 |
| May 17, 2018 | 15 | 629 | 34 |
| May 18, 2018 | 7 | 572 | 6 |
| May 18, 2018 | 15 | 603 | 26 |
| May 18, 2018 | 22 | 454 | 8 |
| May 19, 2018 | 4 | 211 | 13 |
| May 19, 2018 | 7 | 645 | 31 |
| May 19, 2018 | 15 | 530 | 25 |
| May 21, 2018 | 7 | 159 | 3 |
| May 21, 2018 | 10 | 374 | 21 |
| May 21, 2018 | 15 | 53 | 10 |
| May 22, 2018 | 16 | 470 | 18 |
| May 22, 2018 | 22 | 741 | 16 |
| May 23, 2018 | 7 | 178 | 2 |
| May 24, 2018 | 3 | 301 | 30 |
| May 24, 2018 | 15 | 615 | 18 |
| May 24, 2018 | 22 | 731 | 11 |
| May 25, 2018 | 7 | 566 | 36 |
| May 25, 2018 | 15 | 39 | 4 |
| May 29, 2018 | 17 | 396 | 15 |
| May 29, 2018 | 22 | 747 | 12 |
| May 30, 2018 | 7 | 687 | 10 |
| May 30, 2018 | 15 | 644 | 8 |
| May 30, 2018 | 22 | 397 | 5 |
| May 31, 2018 | 3 | 258 | 23 |
| May 31, 2018 | 7 | 291 | 5 |
| Jun. 1, 2018 | 4 | 195 | 16 |
| Jun. 1, 2018 | 7 | 600 | 6 |
| Jun. 1, 2018 | 15 | 650 | 10 |
| Jun. 1, 2018 | 22 | 721 | 18 |
| Jun. 2, 2018 | 15 | 528 | 4 |
| Jun. 4, 2018 | 7 | 700 | 17 |

In addition, the user input following operational values through the interface: Unit cost per defect=$200; Weekly operating hour=120; Shifts=3 (Shift 1:8 am to 4 pm; Shift 2:4 μm to midnight; Shift 3: midnight to 8 am). Additional columns, Day of Week, Shift and Shift Hour are calculated based on the timestamp data (date and hour).

ROAS uses Statistical Process Control p-chart to determine control limits. The control limits (Upper & Lower Control limits for Zone A, B, C) are determined per shift for all of the rows in the dataset.

Where, $$UCLA\text{ (Upper Control Limit }A) = \text{mean} + std\ dev$$

$$UCLB\text{ (Upper Control Limit }B) = \text{mean} + 2 * std\ dev$$

$$UCLC\text{ (Upper Control Limit }C) = \text{mean} + 3 * std\ dev$$

$$LCLA\text{ (Upper Control Limit }A) = \text{mean} - std\ dev$$

$$LCLB\text{ (Upper Control Limit }B) = \text{mean} - 2 * std\ dev$$

$$LCLC\text{ (Upper Control Limit }C) = \text{mean} - 3 * std\ dev$$

The Lower Control Limit values are clipped at zero (i.e. the value is set to zero if the calculation is below zero). For p-chart, the mean and standard deviation for defect rate is calculated as follows.

$$\text{mean} = \text{sum(bad pieces)/sum(good pieces + bad pieces)}$$

$$std\ dev = sqrt\ (\text{mean} * (1 - \text{mean/count})$$

where count is the average number of observations = mean(good_pieces and bad pieces)

For Shift 1:

$$\text{Count} = \text{total good pieces} = 80{,}079$$

$$\text{total bad pieces} = 4{,}082$$

$$\text{mean defect rate} = 4{,}082/(4{,}082 + 80{,}079) = 0.0485$$

$$std\ dev\text{ defect rate} = sqrt(0.0485 * (1 - 0.0485)/507) = 0.00954$$

$$UCLA = 0.0485 + 3 \times 0.00954 = 0.07712$$

$$UCLB = 0.0485 + 2 \times 0.00954 = 0.06758$$

$$UCLC = 0.0485 + 0.00954 = 0.05804$$

$$LCLC = 0.0485 - 0.00954 = 0.03896$$

$$LCLB = 0.0485 - 2 \times 0.00954 = 0.02942$$

$$LCLA = 0.0485 - 3 \times 0.00954 = 0.01988$$

To estimate an achievable opportunity calculation, ROAS first calculates the metrics down to the day of week, shift and shift hour, multiplies by number of weeks and normalizes to operating hours as shown in Table 3. Maximum potential output is calculated assuming zero defect rate. Achievable output is calculated for each individual row assuming that the defect rate can be reduced to UCLB and then aggregated to the day of week, shift and shift. UCLB thus is used as the statistical control parameter. A further parameter such as UCLC can be used as a further statistical control parameter, so that for example, well functioning shifts can be identified so workers can be transferred from one well functioning shift to a less well functioning shift to create a new improved industrial process.

Table 3 shows maximum and achievable savings estimations for Shift 1:

TABLE 3

| Maximum & Achievable Savings Estimations for Shift 1 | | | | | | |
|---|---|---|---|---|---|---|
| Row Labels | Avg Bad_pieces | Avg achievable | Annual Max Units | Annual Achievable Units | Annual Max Savings | Annual Achievable Units |
| Fri-1-2 | 48 | 21 | 3,120 | 1,365 | $624,000.00 | $273,000.00 |
| Fri-1-4 | 64 | 44 | 4,160 | 2,860 | $832,000.00 | $572,000.00 |
| Fri-1-5 | 13 | 2 | 845 | 130 | $169,000.00 | $26,000.00 |
| Fri-1-7 | 5 | 0 | 325 | — | $65,000.00 | $0.00 |
| Fri-1-8 | 13 | 2 | 845 | 130 | $169,000.00 | $26,000.00 |
| Mon-1-1 | 30 | 5 | 1,950 | 325 | $390,000.00 | $65,000.00 |
| Mon-1-2 | 82 | 51 | 5,330 | 3,315 | $1,066,000.00 | $663,000.00 |
| Mon-1-3 | 31 | 13 | 2,015 | 845 | $403,000.00 | $169,000.00 |
| Mon-1-5 | 36 | 22 | 2,340 | 1,430 | $468,000.00 | $286,000.00 |
| Mon-1-8 | 23 | 3 | 1,495 | 195 | $299,000.00 | $39,000.00 |
| Sat-1-1 | 54 | 20 | 3,510 | 1,300 | $702,000.00 | $260,000.00 |
| Sat-1-2 | 14 | 0 | 910 | — | $182,000.00 | $0.00 |
| Sat-1-3 | 53 | 29 | 3,445 | 1,885 | $689,000.00 | $377,000.00 |
| Sat-1-5 | 69 | 54 | 4,485 | 3,510 | $897,000.00 | $702,000.00 |
| Sat-1-8 | 16 | 4 | 1,040 | 260 | $208,000.00 | $52,000.00 |
| Thu-1-1 | 86 | 49 | 5,590 | 3,185 | $1,118,000.00 | $637,000.00 |
| Thu-1-2 | 19 | 0 | 1,235 | — | $247,000.00 | $0.00 |
| Thu-1-4 | 54 | 36 | 3,510 | 2,340 | $702,000.00 | $468,000.00 |
| Thu-1-5 | 28 | 12 | 1,820 | 780 | $364,000.00 | $156,000.00 |
| Thu-1-7 | 9 | 5 | 585 | 325 | $117,000.00 | $65,000.00 |
| Thu-1-8 | 18 | 2 | 1,170 | 130 | $234,000.00 | $26,000.00 |
| Tue-1-1 | 84 | 60 | 5,460 | 3,900 | $1,092,000.00 | $780,000.00 |
| Tue-1-2 | 35 | 14 | 2,275 | 910 | $455,000.00 | $182,000.00 |
| Tue-1-3 | 57 | 33 | 3,705 | 2,145 | $741,000.00 | $429,000.00 |
| Tue-1-5 | 20 | 3 | 1,300 | 195 | $260,000.00 | $39,000.00 |
| Tue-1-8 | 17 | 0 | 1,105 | — | $221,000.00 | $0.00 |
| Wed-1-1 | 32 | 2 | 2,080 | 130 | $416,000.00 | $26,000.00 |
| Wed-1-2 | 11 | 0 | 715 | — | $143,000.00 | $0.00 |
| Wed-1-3 | 30 | 15 | 1,950 | 975 | $390,000.00 | $195,000.00 |
| Wed-1-5 | 19 | 0 | 1,235 | — | $247,000.00 | $0.00 |
| Wed-1-8 | 25 | 4 | 1,625 | 260 | $325,000.00 | $52,000.00 |
| | | Totals | 71,175 | 32,825 | $14,235,000.00 | $6,565,000.00 |

There are a total of 31 unique combinations of Day of Week, Shift, Shift Hour for Shift 1 and a total of 96 combinations for the overall dataset.

$$\text{Average Bad\_Pieces} = \text{average of bad\_pieces}$$

$$\text{Average Achievable} = \text{Average}\left(\text{Max}\left(0, \text{Bad Pieces} - \text{Total Pieces} * UCLB\right)\right)$$

$$\text{Annual Max Potential Units} = \text{Average of Bad\_Pieces} * 52(\text{Weeks/Yr}) * (\text{Weekly Operating Hours/Unique } DOW \text{ Shift } ShiftHour \text{ Combinations})$$

$$\text{Annual Achievable Potential Units} = \text{Average Achievable} * 52(\text{Weeks/Yr}) * (\text{Weekly Operating Hours/Unique } DOW \text{ Shift } ShiftHour \text{ Combinations})$$

$$\text{Annual Max Saving (\$)} = \text{Annual Max Potential Units} * \text{Cost Per Unit Defect}$$

$$\text{Annual Achievable Savings (\$)} = \text{Annual Achievable Potential Units} * \text{Cost Per Unit Defect}$$

The Totals are calculated by summing each of the columns as shown in Table 3

Annual Max Potential Units=71,175

Annual Achievable Potential Units=32,825

Annual Max Savings=$14,235,000

Annual Achievable Savings=$6,565,000

Contribution analysis determines which of the factors likely contribute to high defect rates. ROAS uses Statistical Process Control to determine out of control events as a surrogate metric for high defect rates. Open-source machine learning model XGBoost is used in this example to determine and rank features in descending order of their importance in percentage. The total percentage of feature importance adds to 100%. Feature importances are displayed as graphically as TreeMap with size of rectangle proportional to their percentage.

A typical machine learning model requires two sets of data—

1) values (X) for selected features (independent variables)

2) target values (Y).

ROAS uses the following features as input values (X) to the model—

1) Shift
2) Shift Hour
3) Day of Week
4) Hour of Day
5) Month
6) Day of Month
7) Volume of total pieces produced (Given the large variation in total pieces, the total pieces are segmented into 5 dynamic bins-Below 198 pieces, Above 716 pieces, between 199 & 370 pieces, between 371 & 542 pieces, and between 543 & 715 pieces).

ROAS uses Statistical Process Control Violations as target values (Y).

A statistical Process Control (p-Chart) is used to determine Upper Control Limits (UCLA, UCLB, UCLC) & Lower Control Limits (LCLA, LCLB, LCLC) values for defect rates as described above. Defect rate violations are determined based on the following rules—

1) Any point higher than UCLA is considered a violation
2) Any two points out of three consecutive points above UCLB is considered a violation.
3) Any 4 out of 5 consecutive points above UCLC is considered a violation
4) 7 or more consecutive points on one side of the mean.

process can take several steps or iterations, but such an industrial process control loop previously was not possible as the feedback times were simply too long. Other corrective actions to reduce excess unwanted defects or issues can include lowering of production speeds, enhanced training, worker bonuses for increased productivity, introduction or rest periods, etc. All of these can then be analyzed with ROAS for their effect.

While the present invention has been explained with regard to a specific example, the scope of the invention is described via the claims below.

TABLE 4 shows a Sample dataset for input to the XGBoost Machine Learning Model.

| | Contributing Factors (Features or X values) | | | | | | | Target (Y values) |
|---|---|---|---|---|---|---|---|---|
| Date | Hour | Shift | Total Pieces | Shifthour | Day of Week | Month | Day of Month | Violation |
| Jun. 12, 2017 | 8 | 1 | Between 543 & 715 pcs | 1 | Monday | June | 12 | FALSE |
| Jun. 15, 2017 | 15 | 1 | Between 543 & 715 pcs | 8 | Thursday | June | 15 | FALSE |
| Jun. 16, 2017 | 15 | 1 | Between 543 & 715 pcs | 8 | Friday | June | 16 | FALSE |
| Jun. 19, 2017 | 8 | 1 | Between 543 & 715 pcs | 1 | Monday | June | 19 | FALSE |
| Jun. 19, 2017 | 15 | 1 | Between 543 & 715 pcs | 8 | Monday | June | 19 | TRUE |
| Jun. 21, 2017 | 15 | 1 | Between 371 & 542 pcs | 8 | Wednesday | June | 21 | FALSE |
| Jun. 26, 2017 | 10 | 1 | Between 198 & 370 pcs | 3 | Monday | June | 26 | FALSE |
| Jun. 26, 2017 | 15 | 1 | Between 543 & 715 pcs | 8 | Monday | June | 26 | FALSE |
| Jun. 28, 2017 | 15 | 1 | Between 543 & 715 pcs | 8 | Wednesday | June | 28 | FALSE |
| Jul. 1, 2017 | 15 | 1 | Between 371 & 542 pcs | 8 | Saturday | July | 1 | FALSE |
| Jul. 5, 2017 | 8 | 1 | Between 543 & 715 pcs | 1 | Wednesday | July | 5 | FALSE |
| Jul. 11, 2017 | 9 | 1 | Between 371 & 542 pcs | 2 | Tuesday | July | 11 | FALSE |
| Jul. 13, 2017 | 15 | 1 | Between 543 & 715 pcs | 8 | Thursday | July | 13 | FALSE |
| Jul. 20, 2017 | 9 | 1 | Between 371 & 542 pcs | 2 | Thursday | July | 20 | FALSE |
| Jul. 20, 2017 | 15 | 1 | Between 543 & 715 pcs | 8 | Thursday | July | 20 | FALSE |
| Jul. 25, 2017 | 8 | 1 | Between 543 & 715 pcs | 1 | Tuesday | July | 25 | FALSE |
| Jul. 28, 2017 | 14 | 1 | Less than 198 pcs | 7 | Friday | July | 28 | FALSE |
| Aug. 3, 2017 | 14 | 1 | Less than 198 pcs | 7 | Thursday | August | 3 | TRUE |

TABLE 5 shows the Contribution Analysis Results:

| Factor | Contribution (%) | Shifts |
|---|---|---|
| Shifthour | 22.14 | All Shifts |
| Total Pieces | 17.65 | All Shifts |
| Month | 17.28 | All Shifts |
| Hour | 13.88 | All Shifts |
| Shift | 12.15 | All Shifts |
| Day of Week | 9.78 | All Shifts |
| Day of Month | 7.12 | All Shifts |
| Month | 35.99 | Shift 2 |
| Total Pieces | 28.02 | Shift 2 |
| Hour | 14.74 | Shift 2 |
| Day of Week | 11.83 | Shift 2 |
| Day of Month | 9.42 | Shift 2 |
| Hour | 44.58 | Shift 3 |
| Total Pieces | 17.54 | Shift 3 |
| Day of Month | 13.09 | Shift 3 |
| Day of Week | 12.70 | Shift 3 |
| Month | 12.09 | Shift 3 |
| Total Pieces | 37.79 | Shift 1 |
| Month | 24.80 | Shift 1 |
| Day of Week | 14.51 | Shift 1 |
| Hour | 13.43 | Shift 1 |
| Day of Month | 9.47 | Shift 1 |

The above information is advantageously used to create an entirely new and improved industrial process with higher efficiency and lower defects.

For example, workers from high efficiency shifts can be shifted to lower efficiency shifts with large number of defects, and ROAS can determine the effect of the shift to ensure that the entirety of the process runs within the conditions set by the statistical control parameter. This

What is claimed is:

1. An improved industrial process comprising:

receiving in a processor a plurality of data items related to an industrial process utilizing parts, each data item being time stamped so that each data item includes time stamp and industrial process data regarding an industrial process occurring at a time;

analyzing the plurality of data items in a processor via a plurality of rules, the analyzing identifying deviations of at least one variable of the plurality of data items from a mean value of the variable, the at least one variable being a number of defects of the parts;

setting a statistical control parameter as an achievable quantity for the at least one variable;

identifying the plurality of data items where the at least one variable exceeds the statistical control parameter to define at least one excess; and eliminating the at least one excess to reduce the number of defects of the parts by shifting resources or altering the process related to the at least one quantity, the shifting or altering being a function of the analyzing of the plurality of data items.

2. The improved industrial process as recited in claim 1 wherein the excess is eliminated by shifting resources.

3. The improved industrial process as recited in claim 1 wherein due to the shifting, the at least one variable related to a time period decreases, and the at least one variable related to a further time period increases, the at least one variable related to the time period and the at least one variable related to the further time period both remaining under the statistical control parameter.

4. The improved industrial process as recited in claim 3 wherein the shifting is a function of a second statistical control parameter, the at least one variable being less than the second statistical control parameter before the shifting.

5. The improved industrial process as recited in claim 2 wherein the shifting is a function of a second statistical control parameter, the at least one variable being less than the second statistical control parameter before the shifting.

6. The improved industrial process as recited in claim 2 wherein the shifting or altering occurs stepwise in a control loop.

7. The improved industrial process as recited in claim 6 wherein the at least one excess includes a plurality of excesses, the shifting or altering eliminating the excesses.

8. A system for an improved industrial process comprising:

a processor capable of receiving a plurality of data items related to an industrial process utilizing parts, each data item being time stamped so that each data item includes time stamp and industrial process data regarding an industrial process occurring at a time;

an analyzer analyzing the plurality of data items in a processor via a plurality of rules, the analyzing identifying deviations of at least one variable of the plurality of data items from a mean value of the variable, the at least one variable being a number of defects of the parts;

an input for setting a statistical control parameter as an achievable quantity for the at least one variable;

the processor identifying the plurality of data items where the at least one variable exceeds the statistical control parameter to define an excess;

the system eliminating the excess for the number of defects of the parts of the industrial process by having shifting resources or an altered the process related to the at least one quantity, the shifting or altering being a function of the analyzing of the plurality of data items.

* * * * *